United States Patent
Yokoyama et al.

(10) Patent No.: US 8,117,474 B2
(45) Date of Patent: Feb. 14, 2012

(54) CPU CLOCK CONTROL DURING CACHE MEMORY STALL

(75) Inventors: Ryo Yokoyama, Kanagawa (JP); Tadao Tanikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 12/526,365

(22) PCT Filed: Dec. 10, 2008

(86) PCT No.: PCT/JP2008/003687
§ 371 (c)(1),
(2), (4) Date: Aug. 7, 2009

(87) PCT Pub. No.: WO2009/075102
PCT Pub. Date: Jun. 18, 2009

(65) Prior Publication Data
US 2010/0325469 A1 Dec. 23, 2010

(30) Foreign Application Priority Data
Dec. 13, 2007 (JP) .................................. 2007-321823

(51) Int. Cl.
*G06F 1/32* (2006.01)
(52) U.S. Cl. ........................................ 713/322; 713/323
(58) Field of Classification Search .................. 713/322, 713/323
See application file for complete search history.

(56) References Cited

U.S. PATENT DOCUMENTS
6,233,690 B1 * 5/2001 Choi et al. ..................... 713/322
6,865,684 B2 * 3/2005 Atkinson ....................... 713/323

FOREIGN PATENT DOCUMENTS
JP 2002-6979 1/2002

OTHER PUBLICATIONS

International Search Report issued Feb. 24, 2009 in the International (PCT) Application No. PCT/JP2008/003687.
Diana Marculescu, "On the Use of Microarchitecture-Driven Dynamic Voltage Scaling", Proceedings of Workshop on Complexity-Effective Design in conjunction with ISCA-27, Jun. 2000.

* cited by examiner

*Primary Examiner* — Albert Wang
(74) *Attorney, Agent, or Firm* — Wenderoth, Lind & Ponack, L.L.P.

(57) ABSTRACT

An instruction detecting section (235) detects whether or not there is any succeeding instruction executable regardless of an order based on a data dependency relationship between a presently executed instruction and a succeeding instruction following the presently executed instruction. A clock switch judging section (236) receives notification of the start and end of a memory stall, determines whether or not a memory stall is occurring, and judges whether to switch a clock signal to be supplied to a CPU (200) to a low clock signal (239) or to stop the clock signal based on a detection result of the instruction detecting section (235) if it is judged that the memory stall is occurring. A clock switching section (237) switches the clock signal based on judgment by the clock switch judging section (236). By this construction, power consumption can be reduced without reducing performance.

10 Claims, 9 Drawing Sheets

CPU CLOCK CONTROL DURING CACHE MEMORY STALL

BACKGROUND OF THE INVENTION

1. Field of the Invention

The present invention relates to a clock control device, a clock control method, a clock control program and an integrated circuit for controlling the switching of a clock signal supplied to a central processing unit in the event of a memory stall.

2. Description of the Background Art

In recent years, computer systems provided with processors, cache devices and external input/output ports have become more functional by including a plurality of processors, a plurality of external input/output ports and a plurality of buses having different operation clocks and widths and integration on one chip has been developed. In computer systems, circuitries have become more complicated, for example, by the presence of a memory controller for mediating bus accesses competing among a plurality of processors. There has been a striking improvement in operation clocks of central processing units (hereinafter, called "CPUs"). Further, operation clocks of CPUs of computer systems for controlling portable electronic devices operable, for example, on batteries such as PDAs (Personal Data Assistants), mobile communication terminals, digital cameras and portable audio devices have been and are being steadily improved. On the other hand, there is also a high demand for not only the speeding-up of CPUs, but also lower power consumption for portable electronic devices.

In order to reduce the power consumption of such a computer system, clock gating technology is introduced to processors and busses of the computer system in some cases. The clock gating technology is for reducing the power consumption of the entire computer system by stopping the supply of a clock signal to a circuit block for a period corresponding to an arbitrary number of cycles if an unused circuit block is temporarily present.

In computer systems of recent years, operation clocks of CPUs have been remarkably extended but, in comparison with that, extension rates of operation clocks of buses connected with the CPUs and external main storage devices are low. Thus, upon access to a memory, a phenomenon called a memory stall, in which a CPU is caused to wait, occurs. At this time, a clock signal continues to be supplied since the CPU needs to resume its operation upon completing the memory access. Therefore, even with the introduction of the clock gating technology, a power saving effect is low and a current of several tens of milliamperes flows in some cases.

As conventional technology for reducing power consumption in the event of a memory stall, there has been the one for generating as many clock supply stop signals as clocks corresponding to a set weight number and stopping a clock signal to be supplied at least to one of a CPU and a cache device in a programmable weight controller used for access to an external memory in the event of a cache miss (see, for example, patent literature 1).

However, in the conventional construction, even if an instruction following an instruction issued in the event of a memory stall is executable regardless of an order, it cannot be executed since the clock signal to be supplied to the CPU is stopped. Thus, there has been a problem of causing reduced performance.

[Patent Literature 1]
Japanese Unexamined Patent Publication No. 2002-6979

SUMMARY OF THE DISCLOSURE

In order to solve the above problems, an object of the present invention to provide a clock control device, a clock control method, a clock control program and an integrated circuit capable of reducing power consumption without reducing performance.

One aspect of the present invention is directed to a clock control device, comprising an address information detecting section for detecting access to a main storage device from a central processing unit and detecting address information indicating an accessing address in the main storage device; a cache miss detecting section for detecting the occurrence of a cache miss in a cache device arranged between the central processing unit and the main storage device; a cache data detecting section for detecting the storage of data in the cache device; a stall notifying section for notifying the start and end of a memory stall indicating access to the main storage device based on the address information detected by the address information detecting section, a detection result in the cache miss detecting section and a detection result in the cache data detecting section; an instruction detecting section for detecting whether or not there is any succeeding instruction executable regardless of an order based on a data dependency relationship between a presently executed instruction and a succeeding instruction following the presently executed instruction; a clock switch judging section for receiving the notification of the start and end of the memory stall from the stall notifying section, determining whether or not a memory stall is occurring and judging whether to switch a clock signal to be supplied to the central processing unit to a low clock signal or to stop the clock signal based on a detection result of the instruction detecting section if it is determined that the memory stall is occurring; and a clock switching section for switching the clock signal based on judgment by the clock switch judging section.

According to this construction, the address information detecting section detects the access to the main storage device from the central processing unit and the address information indicating the accessing address in the main storage device. The cache miss detecting section detects the occurrence of the cache miss in the cache device arranged between the central processing unit and the main storage device and the cache data detecting section detects the storage of the data in the cache device. The stall notifying section notifies the start and end of the memory stall indicating the access to the main storage device based on the address information detected by the address information detecting section, the detection result in the cache miss detecting section and the detection result in the cache data detecting section. The instruction detecting section detects whether or not there is any succeeding instruction executable regardless of the order based on the data dependency relationship between the presently executed instruction and the succeeding instruction following the presently executed instruction. The clock switch judging section receives the notification of the start and end of the memory stall from the stall notifying section and determines whether or not the memory stall is occurring. Here, if the present occurrence of the memory stall is determined, whether to switch the clock signal to be supplied to the central processing unit to the low clock signal or to stop the clock signal is judged based on the detection result of the instruction detecting section. Then, the clock switching section switches the clock signal based on the judgment by the clock switch judging section.

According to the present invention, the clock frequency of the clock signal to be supplied to the central processing unit is reduced if the succeeding instruction following the presently executed instruction is executable regardless of the order and the clock signal to be supplied to the central processing unit is stopped if the succeeding instruction cannot be executed regardless of the order. Therefore, power consumption can be reduced without reducing performance.

The object, features and advantages of the present invention become more apparent by the following detailed description and the accompanying drawings.

BEST MODES FOR EMBODYING THE INVENTION

Hereinafter, embodiments of the present invention are described with reference to the accompanying drawings. The following embodiments are merely specific examples of the present invention and not of the nature to limit the technical scope of the present invention.

First Embodiment

Figure 1:
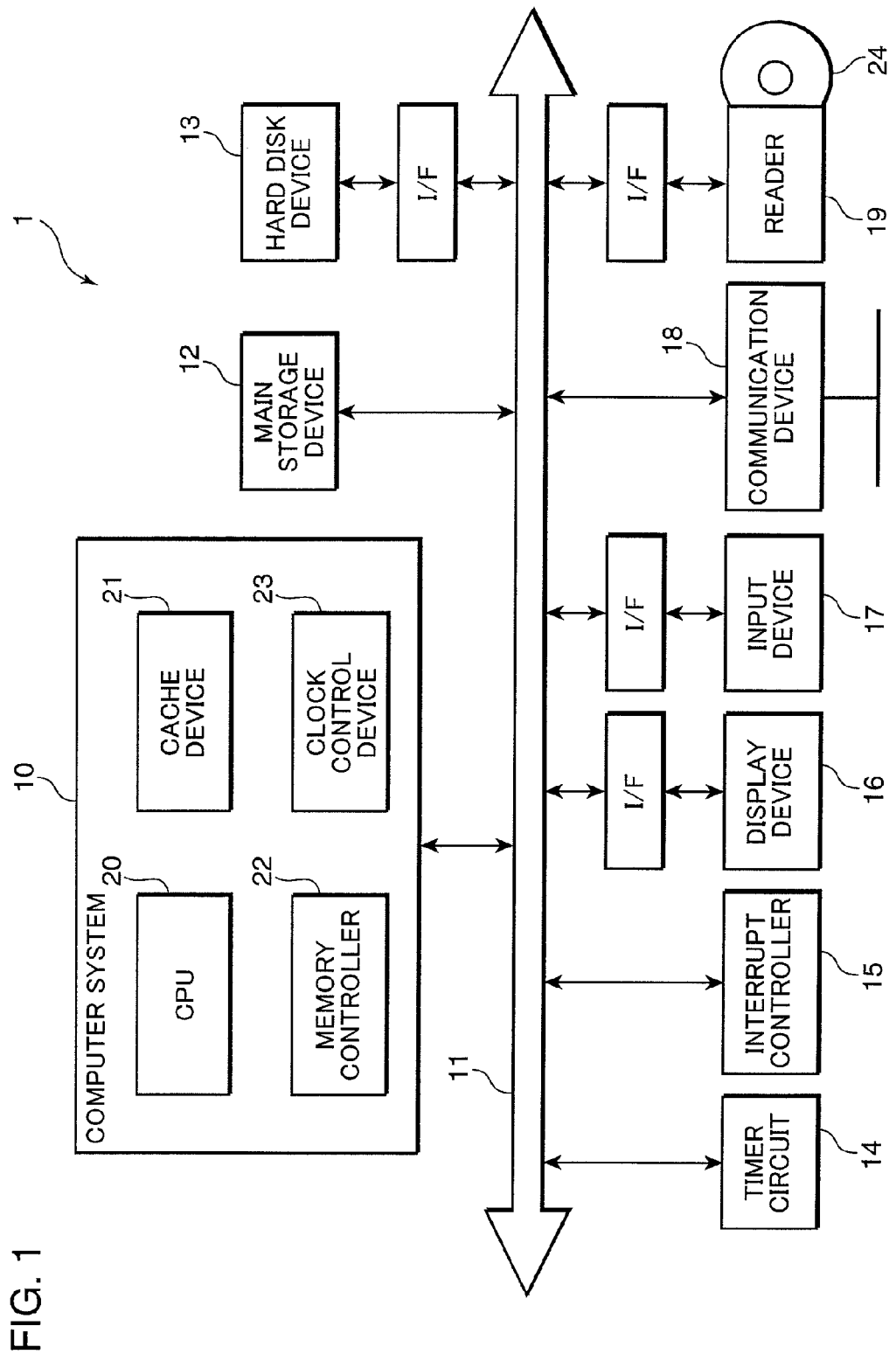
FIG. 1 is a block diagram showing a hardware construction of an information processing apparatus including a computer system according to a first embodiment of the invention.

FIG. 1 is a block diagram showing a hardware construction of an information processing apparatus including a computer system according to a first embodiment of the present invention. The information processing apparatus 1 can be, by itself, used by a user, but may also be embedded into various electrical apparatuses. An example of the information processing apparatus is typically a portable electronic device such as a PDA, a mobile communication terminal, a digital camera or a portable audio device. Since the portable electronic device operates on a battery and particularly requires power saving, it is particularly useful.

The information processing apparatus 1 is provided with a computer system 10, a bus 11, a main storage device 12, a timer circuit 14, an interrupt controller 15, a display device 16, an input device 17 and a communication device 18. The computer system 10, the main storage device 12, the timer circuit 14, the interrupt controller 15, the display device 16, the input device 17 and the communication device 18 are connected to each other via the bus 11. According to needs, a hard disk device 13 and a reader 19 can be connected with the bus 11. The hard disk device 13, the reader 19, the display device 16 and the input device 17 are respectively connected to the bus 11 via interfaces (I/Fs).

The computer system 10 includes a CPU (Central Processing Unit) 20, a cache device 21, a memory controller 22 and a clock control device 23. The computer system 10 is preferably in the form of an integrated circuit such as an LSI (Large Scale Integrated Circuit) in a single semiconductor substrate. Other constituent elements such as the interrupt controller 15 may be mounted on this LSI. This computer system 10 is described in detail later with reference to FIG. 2.

The main storage device 12 includes a ROM (Read Only Memory) and a RAM (Random Access Memory). The ROM stores a computer program specifying the operation of the CPU 20. It is also possible to store the computer program in the hard disk device 13. The CPU 20 performs a process specified by the computer program stored in the ROM or the hard disk device 13 while writing the computer program in the RAM according to needs. The RAM also functions as a medium for temporarily saving data generated as the CPU 20 performs the process.

Although the main storage device 12 has a slower access speed than the cache device 21 to be described later, it can store a large quantity of data. The ROM may be a nonvolatile memory or storage medium writable like a flash ROM and capable of retaining stored contents even if power is turned off. The RAM may be a volatile memory or storage medium on which stored contents are not retained if power is turned off.

The hard disk device 13 writes the computer program or data in an unillustrated built-in hard disk and reads the computer program or data from the unillustrated built-in hard disk.

The interrupt controller 15 relays interrupt request signals sent from the timer circuit 14, the input device 17, the communication device 18 as a network device, the hard disk device 13, the reader 19 and the like to the CPU 20. Priority is given to interrupt requests from the respective devices. The interrupt controller 15 has a function of mediating interrupt requests if they are simultaneously issued from a plurality of devices.

The display device 16 is, for example, an LCD (Liquid Crystal Display) and is for displaying data, images and the like on a screen and outputting data and the like in the form of sounds.

The input device 17 is, for example, a keyboard arranged on a PDA, input buttons arrayed on a mobile phone or a detachable mouse and operated by a user to enter data and the like. The timer circuit 14 outputs a timer interrupt signal in a specified cycle.

The communication device 18 exchanges the computer program or data with external apparatus(es) via a telephone line, a network line, wireless or infrared communication line or the like.

The reader 19 reads a computer program (clock control program) or data recorded on a computer-readable storage medium (e.g. CD, DVD or memory card) 24 or data.

As described above, the information processing apparatus 1 is constructed as a computer. The above computer program can be supplied via an unillustrated program recording medium such as a flexible disc or a CD-ROM and also via a transmission medium such as an electrical communication line. For example, the computer program recorded on a CD-ROM as the program recording medium can be read by connecting the reader 19 with the information processing apparatus 1 and can be stored in the RAM of the main storage device 12 or the hard disk device 13.

In the case of supplying the computer program via the ROM as the program recording medium, the CPU 20 can perform a process in accordance with the computer program by loading the ROM into the main storage device 12. The computer program supplied via a transmission medium such as an electrical communication line is received via the communication device 18 and stored, for example, in the RAM of the main storage device 12 or the hard disk device 13. The transmission medium is not limited to the wired one and may be a wireless transmission medium. The transmission medium is not limited to the communication line, but may be a relay device for relaying the communication line, e.g. a router.

Figure 2:
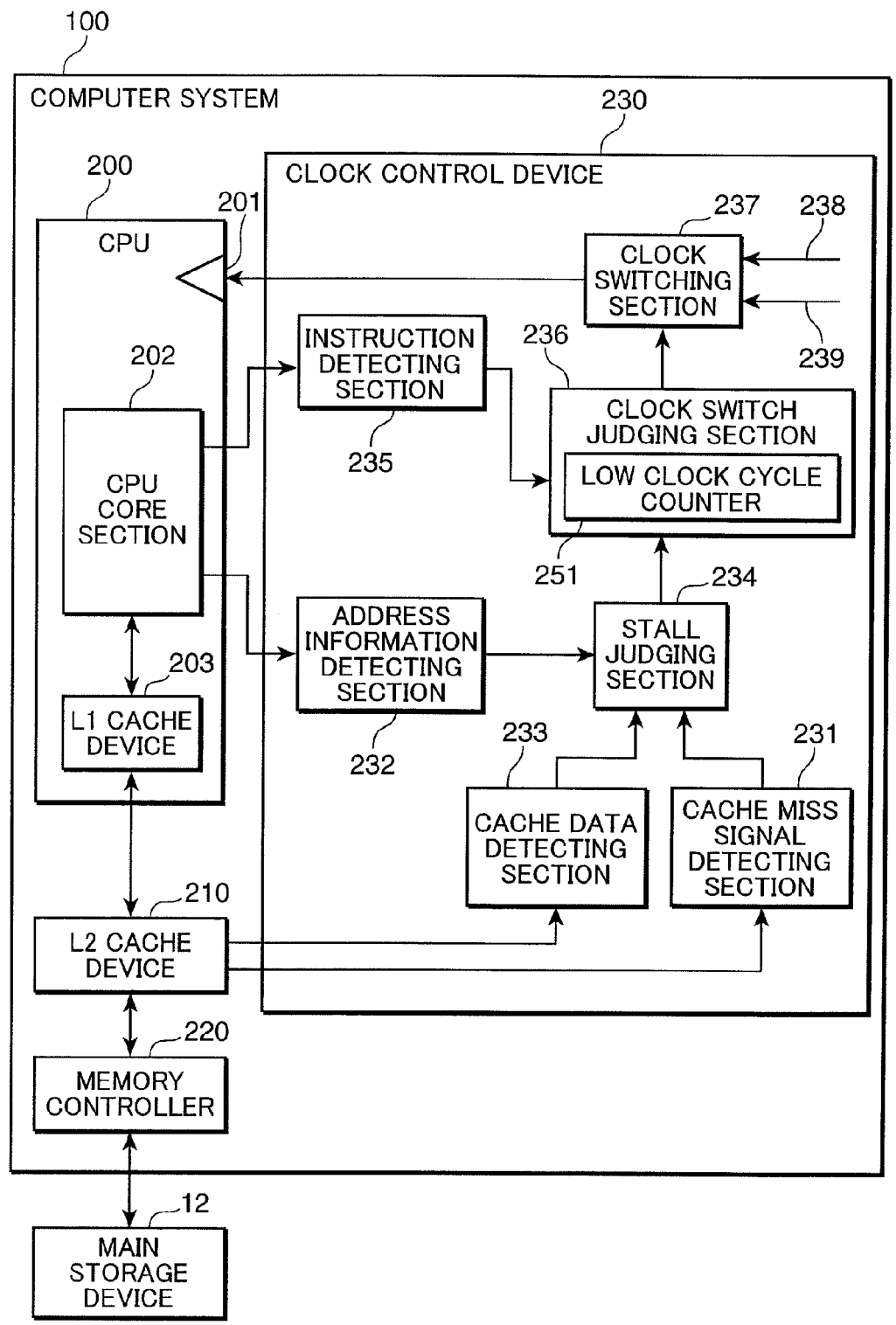
FIG. 2 is a block diagram showing the construction of the computer system according to the first embodiment of the invention.

FIG. 2 is a block diagram showing the construction of the computer system according to the first embodiment of the present invention.

In FIG. 2, a computer system 100 corresponds to the computer system 10 of FIG. 1 described above and a main storage device 12 corresponds to the main storage device 12 of FIG. 1.

The computer system 100 is provided with a CPU 200, an L2 cache device 210, a memory controller 220 and a clock control device 230 and is connected to the main storage device 12 via the bus 11 of FIG. 1. The bus 11 is not shown in FIG. 2.

The CPU 200 corresponds to the CPU 20 of FIG. 1 and includes a clock input section 201 for receiving a clock signal for operating the CPU 200, a CPU core section 202 and an L1 cache device 203. The CPU 200 performs a process required in the computer system 100 by referring to instructions and data stored in the main storage device 12.

The clock input section 201 receives a clock signal supplied from the outside of the CPU 200 and supplies the received clock signal to the CPU core section 202 and the L1 cache device 203.

The CPU core section 202 operates in synchronism with the clock signal supplied by the clock input section 201. The CPU core section 202 is a main section for performing processes in the computer system 100. The CPU core section 202 decodes an instruction after fetching the instruction stored in the L1 cache device 203, the L2 cache device 210 or the externally connected main storage device 12, and executes an instruction corresponding to the decoded result. Further, the CPU core section 202 reads data stored in the L1 cache device 203, the L2 cache device 210 or the externally connected main storage device 12 or writes data in the L1 cache device 203, the L2 cache device 210 or the externally connected main storage device 12 in accordance with the instruction corresponding to the decoded result.

The L1 cache device 203 operates in synchronism with the clock signal supplied by the clock input section 201. The L1 cache device 203 temporarily stores data accessed by the CPU core section 202 while relating it to address information indicating an address in the main storage device 12. Upon accessing the main storage device 12, the CPU core section 202 accesses data stored in the L1 cache device 203 if the data corresponding to the address information is stored in the L1 cache device 203. Thus, an access time can be drastically shortened as compared with the case where the main storage device 12 is accessed. Further, power consumption for the access to the externally connected main storage device 12 can also be reduced.

On the other hand, upon accessing the main storage device 12, the CPU core section 202 accesses data stored in the L2 cache device 210 and starts searching for the data corresponding to the address information if the data corresponding to the address information is not stored in the L1 cache device 203.

The L2 cache device 210 corresponds to the cache device 21 of FIG. 1 and is arranged between the CPU 200 and the main storage device 12. The L2 cache device 210 temporarily stores data accessed by the CPU core section 202 while relating it to address information indicating an address in the main storage device 12. Upon accessing the main storage device 12, the CPU core section 202 accesses data stored in the L2 cache device 210 if the data corresponding to the address information is stored in the L2 cache device 210. Thus, an access time can be drastically shortened as compared with the case where the main storage device 12 is accessed. Further, power consumption for the access to the externally connected main storage device 12 can also be reduced.

On the other hand, upon accessing the main storage device 12, the CPU core section 202 accesses data stored in the main storage device 12 via the memory controller 220 if the data corresponding to the address information is not stored in the L2 cache device 210.

The memory controller 220 corresponds to the memory controller 22 of FIG. 1 and is connected to a circuit in the computer system 100 which circuit accesses the externally connected main storage device 12. For example, the CPU 200 is connected with the memory controller 220 via the L2 cache device 210. The memory controller 220 functions as an interface with the external main storage device 12 having a different operation clock. One or more main storage devices 12 may be connected to the memory controller 220. There may be provided one or more circuits in the computer system 100 which circuits access the externally connected main storage device 12 connected to the memory controller 220. The memory controller 220 has a function of mediating accesses from a plurality of circuits in the computer system 100 connected therewith.

The clock control device 230 corresponds to the clock control device 23 of FIG. 1 and includes a cache miss signal detecting section 231, an address information detecting section 232, a cache data detecting section 233, a stall judging section 234, an instruction detecting section 235, a clock switch judging section 236 and a clock switching section 237.

The cache miss signal detecting section 231 detects the occurrence of a cache miss in the L2 cache device 210. The cache miss signal detecting section 231 detects the occurrence of the cache miss in the L2 cache device 210 by detecting a signal (cache miss signal) notifying the occurrence of the cache miss in the L2 cache device 210. When the CPU core section 202 accesses data in the main storage device 12, the L2 cache device 210 outputs the cache miss signal and address information corresponding to data having experienced the cache miss to the cache miss signal detecting section 231 if data corresponding to the address information and to be accessed is not stored in the L2 cache device 210. The cache miss signal detecting section 231 detects the cache miss signal and notifies the address information corresponding to the data having experienced the cache miss to the stall judging section 234.

The address information detecting section 232 detects the address information issued from the CPU core section 202 if the CPU core section 202 reads data stored in the L1 cache device 203, the L2 cache device 210 or the externally connected main storage device 12 or writes data in the L1 cache device 203, the L2 cache device 210 or the externally connected main storage device 12 in accordance with a decoded instruction. The address information detecting section 232 notifies the detected address information to the stall judging section 234.

The cache data detecting section 233 detects the storage of data in the L2 cache device 210. The cache data detecting section 233 notifies the address information indicating the address of the stored data in the main storage device 12 to the stall judging section 234 upon detecting the storage of the data in the L2 cache device 210.

The cache data detecting section 233 detects the storage of the data in the L2 cache device 210 and the address information in the main storage device 12 corresponding to the stored data when the CPU core section 202 reads data stored in the externally connected main storage device 12 or writes data in the main storage device 12 via the memory controller 220. Further, the cache data detecting section 233 notifies the detected address information to the stall judging section 234.

The stall judging section 234 notifies the start and end of a memory stall indicating access to the main storage device 12 based on the address information detected by the address information detecting section 232, the detection result in the cache miss signal detecting section 231 and the detection result in the cache data detecting section 233. The stall judging section 234 judges the start of the memory stall based on the address information notified by the address information detecting section 232 and the address information notified by the cache miss signal detecting section 231. Further, the stall judging section 234 judges the end of the memory stall based on the address information notified by the address information detecting section 232 and the address information notified by the cache data detecting section 233.

The stall judging section 234 notifies a stall start signal indicating the start of the memory stall to the clock switch judging section 236 if the address information notified by the address information detecting section 232 and that notified by the cache miss signal detecting section 231 coincide. Further, the stall judging section 234 notifies a stall end signal indicating the end of the memory stall to the clock switch judging section 236 if the address information notified by the address information detecting section 232 and that notified by the cache data detecting section 233 coincide.

Specifically, the stall judging section 234 receives the address information detected by the address information detecting section 232 and that detected by the cache miss signal detecting section 231 and verifies the received pieces of address information. If these pieces of address information coincide as a result of verification, the stall judging section 234 judges that the reading of the data stored in the externally connected main storage device 12 or the writing of the data in the main storage device 12 has been started. In other words, the stall judging section 234 judges that the instruction decoded by the CPU core section 202 started the memory stall.

Further, the stall judging section 234 receives the address information detected by the cache data detecting section 233 after judging that the instruction decoded by the CPU core section 202 started the memory stall. Then, the stall judging section 234 verifies the address information detected by the cache data detecting section 233 and that detected by the address information detecting section 232. If these pieces of address information coincide as a result of verification, the stall judging section 234 judges the end of the reading of the data stored in the externally connected main storage device 12 or the end of the writing of the data in the main storage device 12. In other words, the stall judging section 234 judges the end of the memory stall caused by the instruction decoded by the CPU core section 202.

The stall judging section 234 notifies a stall start signal indicating the start of the memory stall or a stall end signal indicating the end of the memory stall to the clock switch judging section 236 based on the judgment result.

The instruction detecting section 235 detects whether or not there is any succeeding instruction executable regardless of the order based on a data dependency relationship between the presently executed instruction and an instruction following the present executed instruction.

The instruction detecting section 235 successively stores the instructions decoded by the CPU core section 202 and searches for the number of instructions executable out of order regardless of the order out of the succeeding instructions of the respective instructions. For example, if the first instruction is the one for updating the content in a register A, it is searched whether or not there is any succeeding instruction using the result of this register A. If the third instruction uses the content in the register A for calculation as a result of search, it can be understood that the first instruction has a data dependency relationship with the third instruction. In this case, since the second instruction has no data dependency relationship with the first instruction, it can be executed without waiting for the end of the first instruction. Therefore, the number of the succeeding instruction(s) following the first instruction and executable out of order is 1.

In this way, the instruction detecting section 235 detects whether or not there is any succeeding instruction executable without using the execution result of the presently executed instruction based on the data dependency relationship between the presently executed instruction and the instruction following the presently executed instruction.

The instruction detecting section 235 notifies an out-of-order instruction number indicating the number of succeeding instructions executable regardless of the order to the clock switch judging section 236 if there is any succeeding instruction executable regardless of the order. In other words, the instruction detecting section 235 receives information on the instruction presently executed by the CPU core section 202 from the CPU core section 202 and notifies the number of succeeding instructions executable out of order (hereinafter, referred to as "out-of-order instruction number") for the presently executed instruction to the clock switch judging section 236.

The clock switching section 237 receives a high clock signal 238 and a low clock signal 239 to be supplied to the CPU 200. The high clock signal 238 and the low clock signal 239 are generated by an unillustrated clock signal generating section. The low clock signal 239 is a clock signal having a lower frequency than the high clock signal 238.

The clock switching section 237 switches the clock signal in accordance with judgment by the clock switch judging section 236. The clock switching section 237 sends the high clock signal 238 to the clock input section 201 unless receiving a low clock switch signal indicating the switch to the low clock signal 239 from the clock switch judging section 236. Further, the clock switching section 237 sends the low clock signal 239 to the clock input section 201 when receiving the low clock switch signal from the clock switch judging section 236. Furthermore, the clock switching section 237 stops the clock signal to be supplied to the clock input section 201 when receiving a clock stop signal indicating the stop of the clock signal.

The clock switch judging section 236 receives notification on the start and end of a memory stall from the stall judging section 234, determines whether or not the memory stall is occurring and judges whether to switch the clock signal to be supplied to the CPU 200 to the low clock signal 239 or to stop the clock signal based on the detection result of the instruction detecting section 235 upon judging that the memory stall is occurring.

The clock switch judging section 236 judges to switch the clock signal to be supplied to the CPU 200 to the low clock signal 239 if the presence of any succeeding instruction executable regardless of the order is detected by the instruction detecting section 235, and judges to stop the clock signal to be supplied to the CPU 200 if the absence of the succeeding instruction executable by the instruction detecting section 235 regardless of the order is detected.

The clock switch judging section 236 receives the stall start signal or the stall end signal from the stall judging section 234 and determines whether or not the memory stall is occurring. The clock switch judging section 236 judges the present occurrence of the memory stall during a period between the notification of the stall start signal and that of the stall end signal by the stall judging section 234.

The clock switch judging section 236 also receives information on the number of succeeding instructions executable out of order for the instruction presently executed by the CPU core 202 from the instruction detecting section 235. The clock switch judging section 236 performs nothing in the case of judging the absence of the memory stall since receiving no stall start signal. Thus, the clock switching section 237 continues to send the high clock signal, which is the clock signal being presently sent, to the clock input section 201.

The clock switch judging section 236 determines a frequency of switching the clock signal to be supplied to the CPU 200 to the low clock signal 239 in accordance with the out-of-order instruction number notified by the instruction detecting section 235.

The clock switch judging section 236 includes a low clock cycle counter 251. The out-of-order instruction number detected by the instruction detecting section 235 is set in the low clock cycle counter 251. The clock switch judging section 236 sets this out-of-order instruction number as the value of the low clock cycle counter 251 when the out-of-order instruction number is notified by the instruction detecting section 235.

The clock switch judging section 236 judges whether or not the value of the low clock cycle counter 251 is 0 in the case of judging the present occurrence of the memory stall. The clock switch judging section 236 sends a clock stop signal indicating the stop of the clock signal to be supplied to the CPU 200 to the clock switching section 237 upon judging that the value of the low clock cycle counter 251 is 0. The clock switch judging section 236 decrements the value of the low clock cycle counter 251 after sending the low clock switch signal indicating the switch of the clock signal to be supplied to the CPU 200 to the low clock signal 239 to the clock switching section 237 upon judging that the value of the low clock cycle counter 251 is not 0.

The clock switch judging section 236 stops the clock stop signal or the low clock switch signal being sent after resetting the value of the low clock cycle counter 251 upon judging that the memory stall is not occurring. When the low clock switch signal is stopped, the clock switching section 237 switches the clock signal to be outputted from the low clock signal 239 to the high clock signal 238. Further, when the clock stop signal is stopped, the clock switching section 237 outputs the high clock signal 238 that has been stopped.

In the case of judging the present occurrence of the memory stall, the clock switch judging section 236 judges whether to switch the clock signal to be supplied to the CPU 200 to the low clock signal 239 or to stop the clock signal based on the information on the number of succeeding instructions executable out of order for the instruction presently executed by the CPU core section 202. The clock switch judging section 236 judges to switch the clock signal to be supplied to the CPU 200 to the low clock signal 239 if the out-of-order instruction number is other than 0, i.e. the succeeding instruction can be executed out of order. The clock switch judging section 236 judges to stop the clock signal to be supplied to the CPU 200 if the out-of-order instruction number is 0, i.e. no succeeding instruction can be executed out of order.

Upon judging to switch to the low clock signal 239, the clock switch judging section 236 sends the low clock switch signal for switching the clock signal to the low clock signal 239 to the clock switching section 237. On the other hand, upon judging to stop the clock signal, the clock switch judging section 236 sends the clock stop signal for stopping the clock signal to the clock switching section 237.

By the above construction, when a memory stall is occurring in the CPU 200, the clock control device of this embodiment can switch the clock signal to be supplied to the CPU 200 to the low clock signal 239 if succeeding instruction(s) can be executed out of order and can stop the clock signal to be supplied to the CPU 200 if no succeeding instruction can be executed out of order. Thus, it is possible to prevent a performance reduction of the computer system and reduce power consumption during the occurrence of the memory stall.

In the first embodiment, the computer system 100 corresponds to an example of a clock control device; the L2 cache device to an example of a cache device; the cache miss signal detecting section 231 to an example of a cache miss detecting section; the stall judging section 234 to an example of a stall notifying section; and the low clock cycle counter 251 to an example of a counter.

Figure 3:
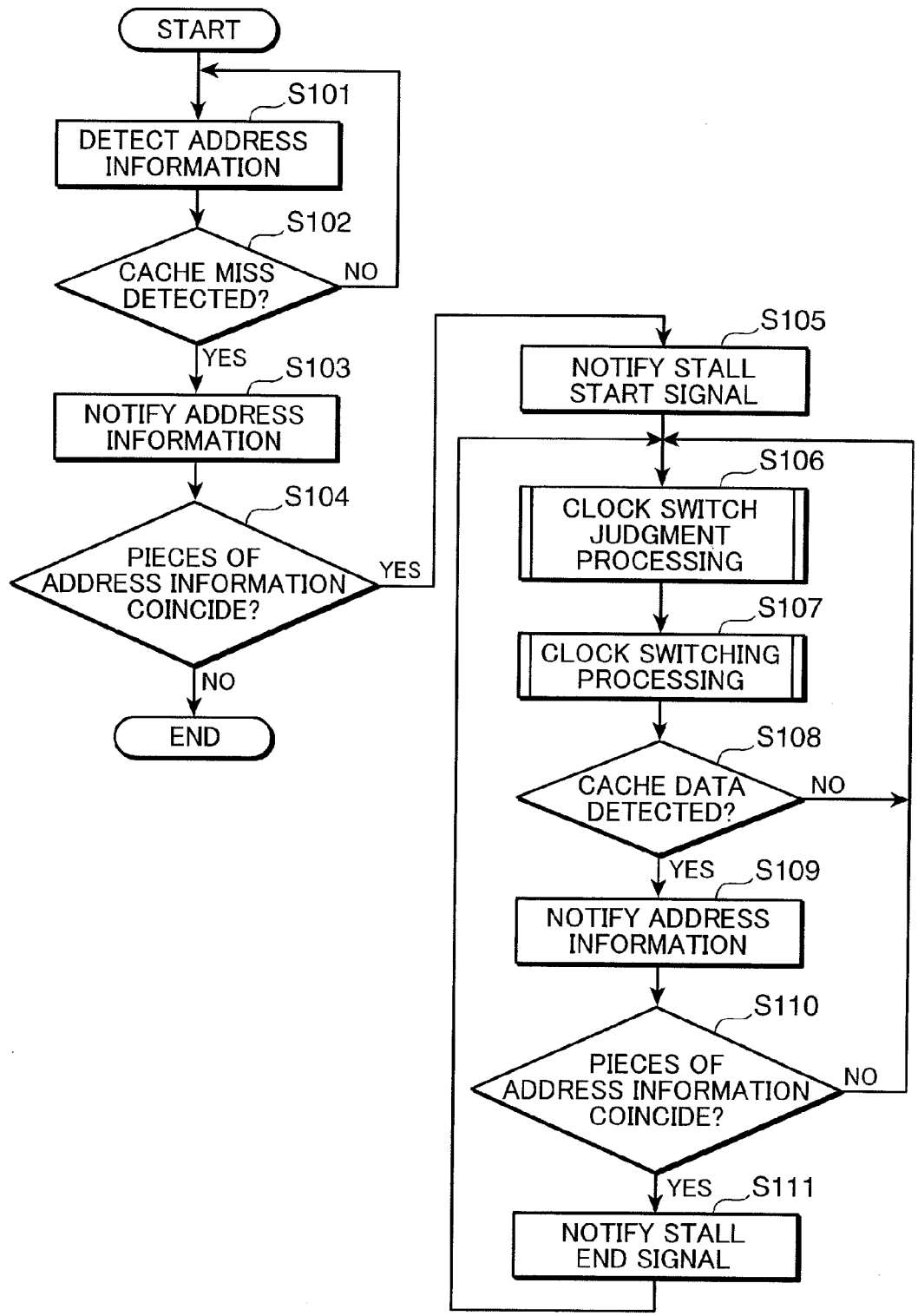
FIG. 3 is a flow chart showing the flow of a clock control process in a clock control device according to the first embodiment of the invention.

Next, a clock control process in the clock control device according to the first embodiment of the present invention is described. FIG. 3 is a flow chart showing the flow of the clock control process in the clock control device in the first embodiment of the present invention.

First of all, the address information detecting section 232 detects access to the main storage device 12 from the CPU 200 and detects address information indicating an accessing address in the main storage device 12 (Step S101). The address information detecting section 232 notifies the detected address information to the stall judging section 234.

Subsequently, the cache miss signal detecting section 231 judges whether or not any cache miss has been detected in the L2 cache device 210 (Step S102). Here, if it is judged that no cache miss has been detected (NO in Step S102), this routine returns to the processing in Step S101.

On the other hand, if it is judged that the cache miss has been detected (YES in Step S102), the cache miss signal detecting section 231 notifies the address information indicating the address of the data having experienced the cache miss in the main storage device 12 to the stall judging section 234 (Step S103).

Subsequently, the stall judging section 234 judges whether or not the address information notified by the address information detecting section 232 and that notified by the cache miss signal detecting section 231 coincide (Step S104). Here, if these pieces of address information are judged not to coincide (NO in Step S104), the stall judging section 234 judges the absence of the memory stall and ends the clock control process.

On the other hand, if the two pieces of address information are judged to coincide (YES in Step S104), the stall judging section 234 judges the occurrence of the memory stall and notifies a stall start signal to the clock switch judging section 236 (Step S105).

Subsequently, the clock switch judging section 236 performs a clock switch judgment processing for judging whether to switch the clock signal to be supplied to the CPU 200 to the low clock signal 239 or to stop the clock signal (Step S106). The clock switch judgment processing in Step S106 is described in detail later with reference to FIG. 4.

Subsequently, the clock switching section 237 performs a clock signal switching processing for switching the clock signal to be supplied to the CPU 200 based on judgment by the clock switch judging section 236 (Step S107). The clock switching processing in Step S107 is described in detail later with reference to FIG. 5.

Subsequently, the cache data detecting section 233 judges whether or not any data (cache data) has been detected in the L2 cache device 210 (Step S108). Here, if no cache data is judged to have been detected (NO in Step S108), this routine returns to the processing in Step S106.

On the other hand, if the cache data is judged to have been detected (YES in Step S108), the cache data detecting section 233 notifies the address information indicating the address of the data stored in the L2 cache device 210 in the main storage device 12 to the stall judging section 234 (Step S109).

Subsequently, the stall judging section 234 judges whether or not the address information notified by the address information detecting section 232 and that notified by the cache data detecting section 233 coincide (Step S110). Here, if these pieces of address information are judged not to coincide (NO in Step S110), this routine returns to the processing in Step S106. The clock control process may be ended if these pieces of address information are judged not to coincide.

On the other hand, if the two pieces of address information are judged to coincide (YES in Step S110), the stall judging section 234 judges the end of the memory stall and notifies a stall end signal to the clock switch judging section 236 (Step S111) and this routine returns to the processing in Step S106.

Figure 4:
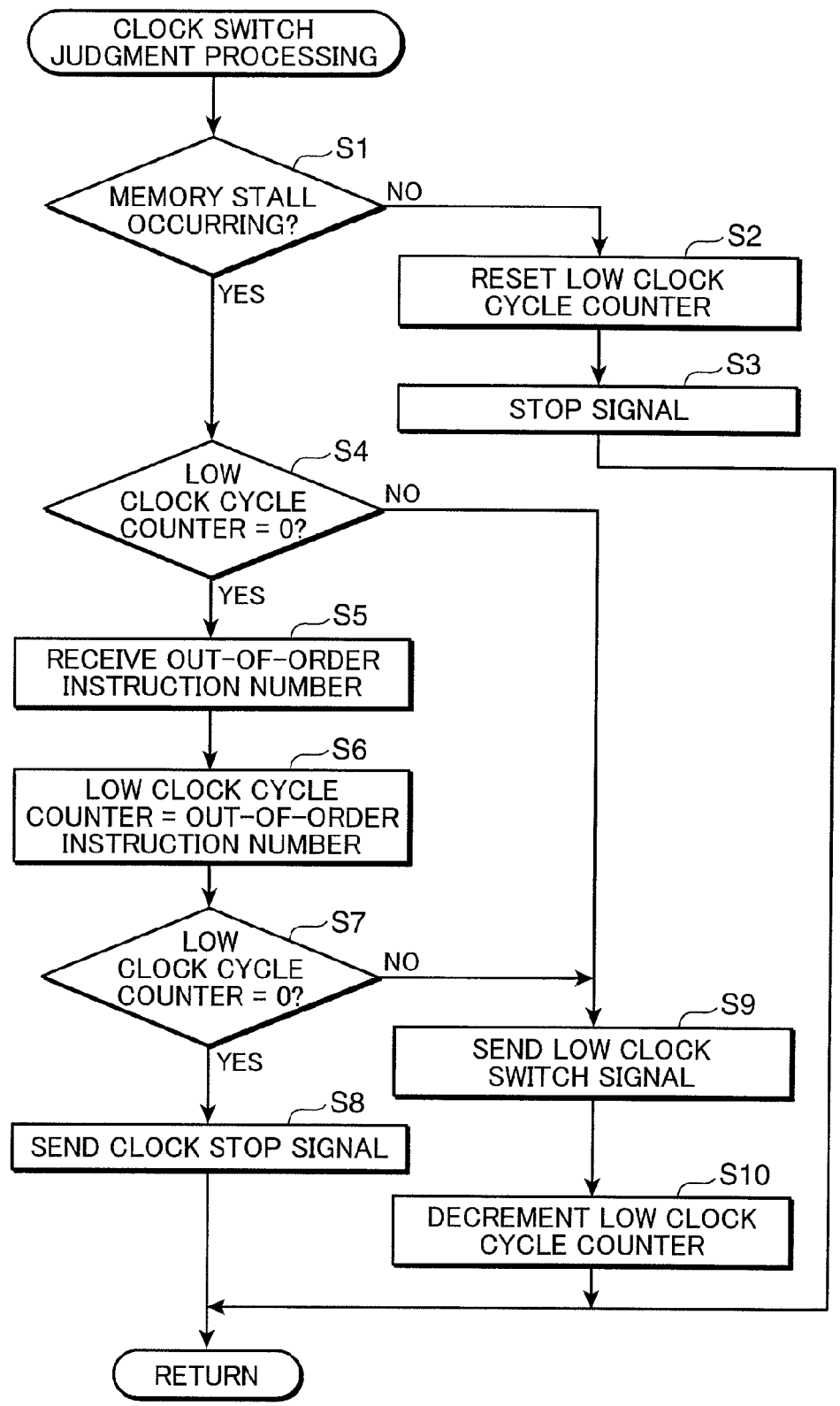
FIG. 4 is a flow chart showing the flow of a clock switch judgment process by a clock switch judging section in Step S106 of FIG. 3.

Next, the clock switch judgment processing by the clock switch judging section 236 in Step S106 of FIG. 3 is described. FIG. 4 is a flow chart showing the flow of the clock switch judgment processing by the clock switch judging section 236 in Step S106 of FIG. 3. Here, it is assumed that the processing is started with an initial value of the low clock cycle counter 251 set to 0.

The clock switch judging section 236 determines whether or not the CPU core section 202 is presently experiencing a memory stall in accordance with the stall start signal and the stall end signal received from the stall judging section 234 (Step S1). In other words, the clock switch judging section 236 determines the present occurrence of the memory stall in the case of receiving the stall start signal from the stall judging section 234 while determining the absence of the memory stall in the case of receiving the stall end signal from the stall judging section 234.

If it is determined that no memory stall is occurring (NO in Step S1), the clock switch judging section 236 resets the low clock cycle counter 251, i.e. sets the value of the low clock cycle counter 251 to 0 (Step S2). Subsequently, the clock switch judging section 236 stops the signal being sent to the clock switching section 237, i.e. the clock stop signal or the low clock switch signal (Step S3). Thereafter, this routine proceeds to the processing in Step S107 of FIG. 3.

During a period of the memory stall, i.e. if it is determined that the memory stall is occurring (YES in Step S1), the clock switch judging section 236 determines whether or not the value of the low clock cycle counter 251 is 0 (Step S4).

If the value of the low clock cycle counter 251 is determined not to be 0 (NO in Step S4), the clock switch judging section 236 judges that there is an instruction executable out of order for the presently executed instruction and sends the low clock switch signal to the clock switching section 237 (Step S9). Subsequently, the clock switch judging section 236 decrements the low clock cycle counter 251 (Step S10). Thereafter, this routine proceeds to the processing in Step S107 of FIG. 3.

On the other hand, if the value of the low clock cycle counter 251 is determined to be 0 (YES in Step S4), the clock switch judging section 236 receives the out-of-order instruction number from the instruction detecting section 235 (Step S5). Subsequently, the clock switch judging section 236 sets the value of the received out-of-order instruction number as the value of the low clock cycle counter 251 (Step S6).

Subsequently, the clock switch judging section 236 determines whether or not the value of the low clock cycle counter 251 is 0 (Step S7). If the value of the low clock cycle counter 251 is determined not to be 0 (NO in Step S7), it indicates the presence of any instruction executable out of order for the presently executed instruction and, hence, the clock switch judging section 236 sends the low clock switch signal to the clock switching section 237 (Step S9). Subsequently, the clock switch judging section 236 decrements the low clock cycle counter 251 (Step S10). Thereafter, this routine returns to the processing in Step S1 to repeat the processings in Step S1 and succeeding steps. In this way, the clock switch judging section 236 continues to send the low clock switch signal until the value of the low clock cycle counter 251 becomes 0.

If the value of the low clock cycle counter 251 is determined to be 0 (YES in Step S7), succeeding instructions are those that cannot be executed out of order and, hence, the clock switch judging section 236 sends a clock stop signal to the clock switching section 237 (Step S8). Thereafter, this routine proceeds to the processing in Step S107 of FIG. 3. In this way, the clock switch judging section 236 continues to send the clock stop signal while the memory stall is occurring.

In this way, the clock switching section 237 judges a period from the receipt of the stall start signal to the receipt of the stall end signal as a memory stall occurring period and switches the clock signal to be supplied to the CPU 200 to the low clock signal 239 if any succeeding instruction can be executed out of order. If no succeeding instruction can be executed out of order, the clock switching section 237 stops the clock signal to the supplied to the CPU 200. Thereafter, upon receiving the stall end signal, the clock switching section 237 judges the absence of the memory stall, whereby the normal high clock signal 238 is supplied to the CPU 200.

Figure 5:
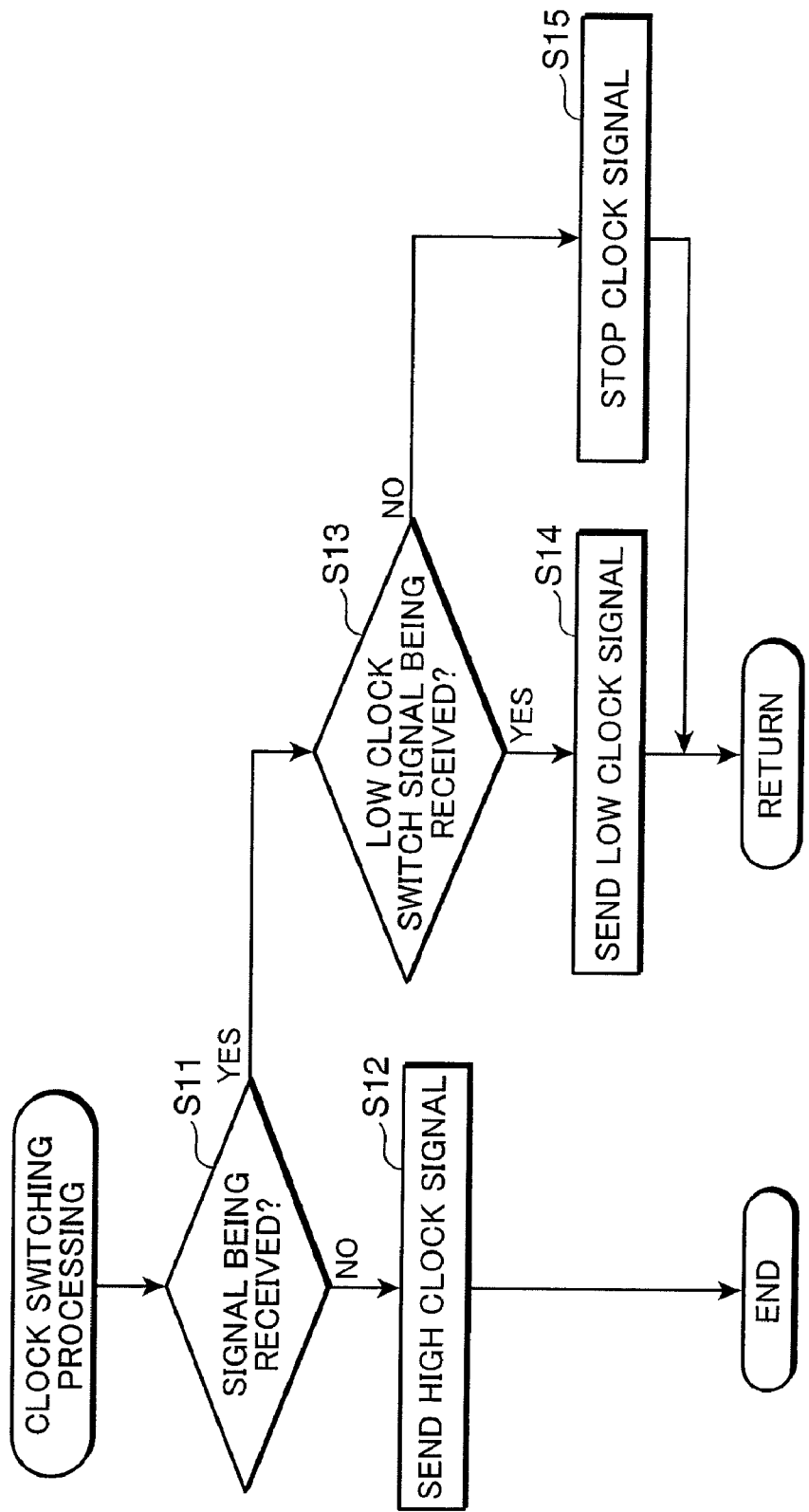
FIG. 5 is a flow chart showing the flow of a clock switching process by the clock switching section in Step S107 of FIG. 3.

Next, the clock switching processing by the clock switching section 237 in Step S107 of FIG. 3 is described. FIG. 5 is a flow chart showing the flow of the clock switching processing by the clock switching section 237 in Step S107 of FIG. 3.

First of all, the clock switching section 237 judges whether or not the low clock switch signal or the clock stop signal is being received from the clock switch judging section 236 (Step S11). Here, if it is judged that the low clock switch signal or the clock stop signal is not being received (NO in Step S11), the clock switching section 237 sends the high clock signal 238 to the clock input section 201 of the CPU 200 (Step S12).

On the other hand, if it is judged that the low clock switch signal or the clock stop signal is being received (YES in Step S11), the clock switching section 237 judges whether or not the low clock switch signal is being received (Step S13).

Here, if it is judged that the low clock switch signal is being received (YES in Step S13), the clock switching section 237 sends the low clock signal 239 to the clock input section 201 of the CPU 200 (Step S14).

On the other hand, if it is judged the low clock switch signal is not being received (NO in Step S13), the clock switching section 237 judges the receipt of the clock stop signal and stops the clock signal (Step S15).

By the above, if any succeeding instruction can be executed out of order when the CPU 200 is experiencing a memory stall, the clock signal to be supplied to the CPU 200 is switched to the low clock signal 239. If no succeeding instruction can be executed out of order, the clock signal to be supplied to the CPU 200 is stopped. Thus, it is possible to realize low power consumption without reducing performance during the memory stall.

Second Embodiment

Figure 6:
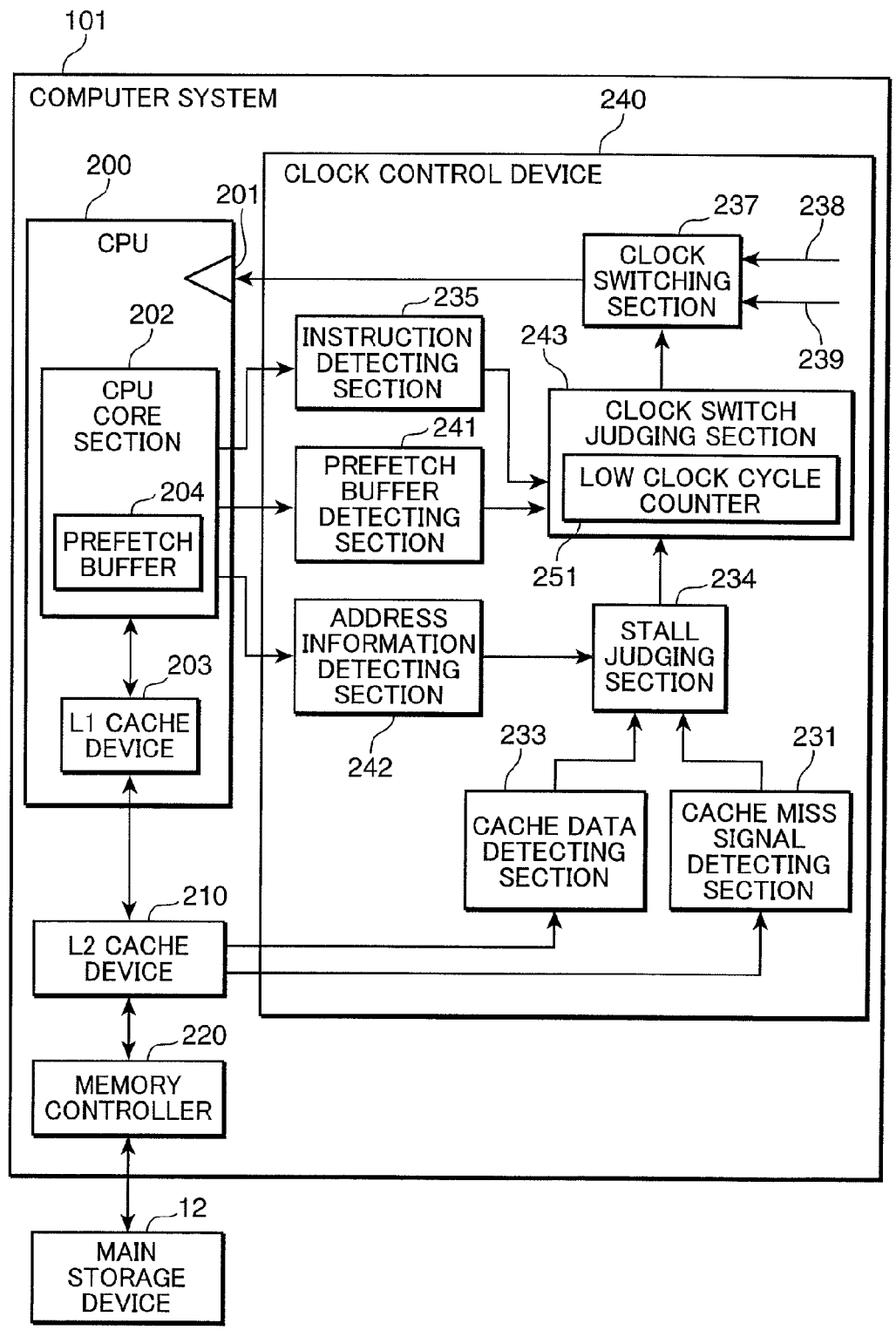
FIG. 6 is a block diagram showing the construction of a computer system according to a second embodiment of the invention.

FIG. 6 is a block diagram showing the construction of a computer system according to a second embodiment of the present invention. Since the construction of an information processing apparatus of the second embodiment other than the computer system is the same as that of the information processing apparatus of the first embodiment shown in FIG. 1, it is not described. In FIG. 6, the same constituent elements as those in FIG. 2 are identified by the same reference numerals and not described.

In FIG. 6, a computer system 101 corresponds to the computer system 10 of FIG. 1 described above and a main storage device 12 corresponds to the main storage device 12 of FIG. 1.

The computer system 101 is provided with a CPU 200, an L2 cache device 210, a memory controller 220 and a clock control device 240 and connected to the main storage device 12 via the bus 11 of FIG. 1. The construction other than the clock control device 240 is similar to that of FIG. 2.

The clock control device 240 corresponds to the clock control device 23 of FIG. 1 and includes a cache miss signal detecting section 231, an address information detecting section 242, a cache data detecting section 233, a stall judging section 234, an instruction detecting section 235, a prefetch buffer detecting section 241, a clock switch judging section 243 and a clock switching section 237. Since the construction other than the prefetch buffer detecting section 241, the address information detecting section 242 and the clock switch judging section 243 is already described in the first embodiment, only different constituent elements are described in detail.

The CPU 202 includes a prefetch buffer 204. The prefetch buffer 204 stores an instruction the CPU core section 202 fetched from the main storage device 12.

The prefetch buffer detecting section 241 is connected to the CPU core section 202 and the clock switch judging section 243. The prefetch buffer detecting section 241 detects that the prefetch buffer 204 for storing the instruction the CPU core section 202 fetched from the main storage device 12 is empty. The prefetch buffer detecting section 241 sends a prefetch buffer empty signal to the clock switch judging section 243 in a cycle of storing the instruction in the prefetch buffer 204 by the CPU core section 202 if the prefetch buffer 204 is empty.

The address information detecting section 242 is connected to the CPU core section 202 and the stall judging section 234. The address information detecting section 242 detects address information of the instruction fetched by the CPU core section 202 and notifies the detected address information to the stall judging section 234. The address information detected by the address information detecting section 242 indicates an address in the main storage device 12 accessed by the CPU core section 202.

The clock switch judging section 243 is connected to the stall judging section 234, the instruction detecting section 235, the clock switching section 237 and the prefetch buffer detecting section 241. The clock switch judging section 243 receives a stall start signal or a stall end signal from the stall judging section 234 and determines whether or not a memory stall is occurring. The clock switch judging section 243 also receives information on the number of succeeding instructions executable out of order for the instruction presently executed by the CPU core section 202 from the instruction detecting section 235. Further, the clock switch judging section 243 receives the prefetch buffer empty signal from the prefetch buffer detecting section 241.

The clock switch judging section 243 judges to switch a clock signal to be supplied to the CPU 200 to a low clock signal 239 if the prefetch buffer detecting section 241 detects that the prefetch buffer 204 is empty. Further, the clock switch judging section 243 judges whether or not a memory stall is occurring if the prefetch buffer detecting section 241 detects that the prefetch buffer 204 is not empty.

The clock switch judging section 243 judges to switch the clock signal to be supplied to the CPU 200 to the low clock signal 239 while receiving the prefetch buffer empty signal from the prefetch buffer detecting section 241, and sends a low clock switch signal to the clock switching section 237. In this case, the clock switch judging section 243 judges to switch the clock signal to be supplied to the CPU 200 to the low clock signal 239 while receiving the prefetch buffer empty signal regardless of whether or not the memory stall is occurring.

Further, the clock switch judging section 243 performs nothing in the case of judging the absence of the memory stall since receiving no stall start signal while receiving no prefetch buffer empty signal. Thus, the clock switching section 237 continues to send the high clock signal, which is the clock signal being presently sent, to the clock input section 201.

In the case of judging the occurrence of the memory stall while receiving no prefetch buffer empty signal, the clock switch judging section 243 judges whether to switch the clock signal to be supplied to the CPU 200 to the low clock signal 239 or to stop the clock signal based on information on the number of succeeding instructions executable out of order for the instruction presently executed by the CPU core section 202. If the out-of-order instruction number is other than 0, i.e. if a succeeding instruction can be executed out of order, the clock switch judging section 243 judges to switch the clock signal to be supplied to the CPU 200 to the low clock signal 239. Further, the clock switch judging section 243 judges to stop the clock signal to be supplied to the CPU 200 if the out-of-order instruction number is 0, i.e. if no succeeding instruction can be executed out of order.

In the case of judging to switch to the low clock signal 239, the clock switch judging section 243 sends a low clock switch signal for switching the clock signal to the low clock signal 239 to the clock switching section 237. On the other hand, in the case of judging to stop the clock signal, the clock switch judging section 243 sends a clock stop signal for stopping the clock signal to the clock switching section 237.

The clock switch judging section 243 includes a low clock cycle counter 251. The low clock cycle counter 251 is not described here since being already described in the first embodiment.

Figure 7:
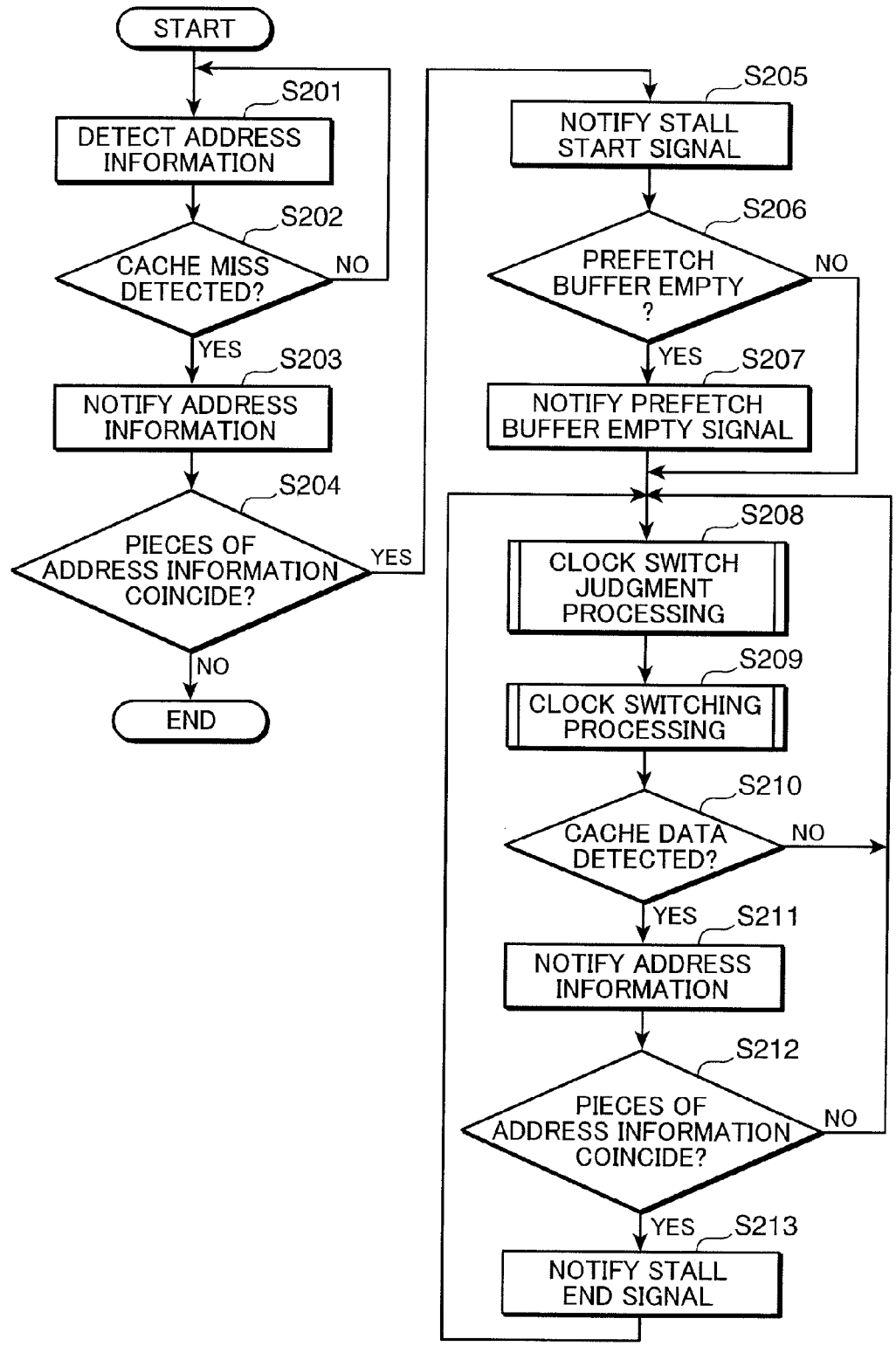
FIG. 7 is a flow chart showing the flow of a clock control process in a clock control device according to the second embodiment of the invention.

Next, a clock control process in the clock control device according to the second embodiment of the present invention is described. FIG. 7 is a flow chart showing the flow of the clock control process in the clock control device according to the second embodiment of the present invention.

Since processings in Steps S201 to S205, S209 to S213 of FIG. 7 are the same as those in Steps S101 to S105, S107 to S111 of FIG. 3, they are not described in detail.

The prefetch buffer detecting section 241 judges whether or not the prefetch buffer 204 is empty (Step S206). If the prefetch buffer 204 is judged not to be empty (NO in Step S206), this routine proceeds to processing in Step S208. On the other hand, if the prefetch buffer 204 is judged to be empty (YES in Step S206), the prefetch buffer detecting section 241 notifies a prefetch buffer empty signal to the clock switch judging section 243.

Subsequently, the clock switch judging section 243 performs a clock switch judgment processing for judging whether to switch the clock signal to be supplied to the CPU 200 to the low clock signal 239 or to stop the clock signal (Step S208). The clock switch judgment processing in Step S208 is described in detail later with reference to FIG. 8.

Figure 8:
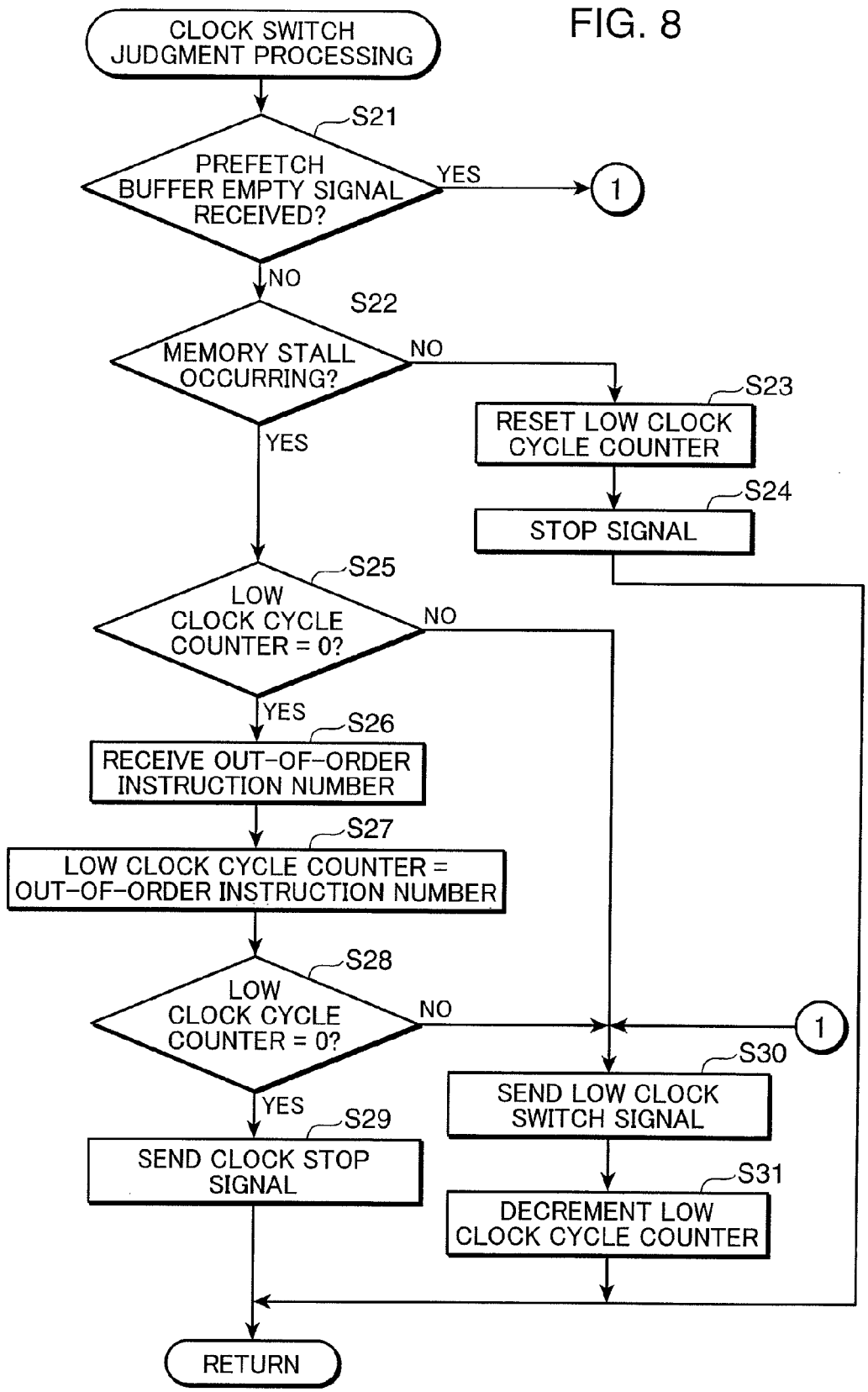
FIG. 8 is a flow chart showing the flow of a clock switch judgment process by a clock switch judging section in Step S208 of FIG. 7.

Next, the clock switch judgment processing by the clock switch judging section 243 in Step S208 of FIG. 7 is described. FIG. 8 is a flow chart showing the flow of the clock switch judgment processing by the clock switch judging section 243 in Step S208 of FIG. 7. Here, it is assumed that the processing is started with an initial value of the low clock cycle counter 251 set to 0.

First of all, the clock switch judging section 243 judges whether or not the prefetch buffer empty signal has been received from the prefetch buffer detecting section 241 (Step S21). Here, if the receipt of the prefetch buffer empty signal is judged (YES in Step S21), the clock switch judging section 243 sends the low clock switch signal to the clock switching section 237 (Step S30).

On the other hand, if the receipt of no prefetch buffer empty signal is judged (NO in Step S21), the clock switch judging section 243 judges whether or not the CPU core section 202 is presently experiencing a memory stall in accordance with the stall start signal and the stall end signal received from the stall judging section 234 (Step S22). Since the processings in Steps S22 to S31 are the same as those in Steps S1 to S10 of FIG. 4, they are not described in detail.

This routine proceeds to processing in Step S209 of FIG. 7 after the clock switch judging section 243 stops the clock stop signal or the low clock switch signal in Step S24. Further, this routine proceeds to the processing in Step S209 of FIG. 7 after the clock switch judging section 243 sends the clock stop signal to the clock switching section 237 in Step S29. Furthermore, this routine proceeds to the processing in Step S209 of FIG. 7 after the clock switch judging section 243 decrements the low clock cycle counter 251 in Step S31.

By the above, the clock control device of the second embodiment can realize low power consumption without reducing performance by switching the clock signal to be supplied to the CPU 200 to the low clock signal 239 when the prefetch buffer 204 of the CPU 200 is empty.

After the succeeding instruction is stored in the prefetch buffer 204, the clock signal to be supplied to the CPU 200 is switched to the low clock signal 239 and the succeeding instruction is executed out of order if the CPU 200 is experiencing a memory stall and the succeeding instruction can be executed out of order. If no succeeding instruction can be executed out of order although the CPU 200 is experiencing a memory stall, the clock signal to be supplied to the CPU 200 is stopped. In this way, low power consumption can be realized without reducing performance.

Third Embodiment

Figure 9:
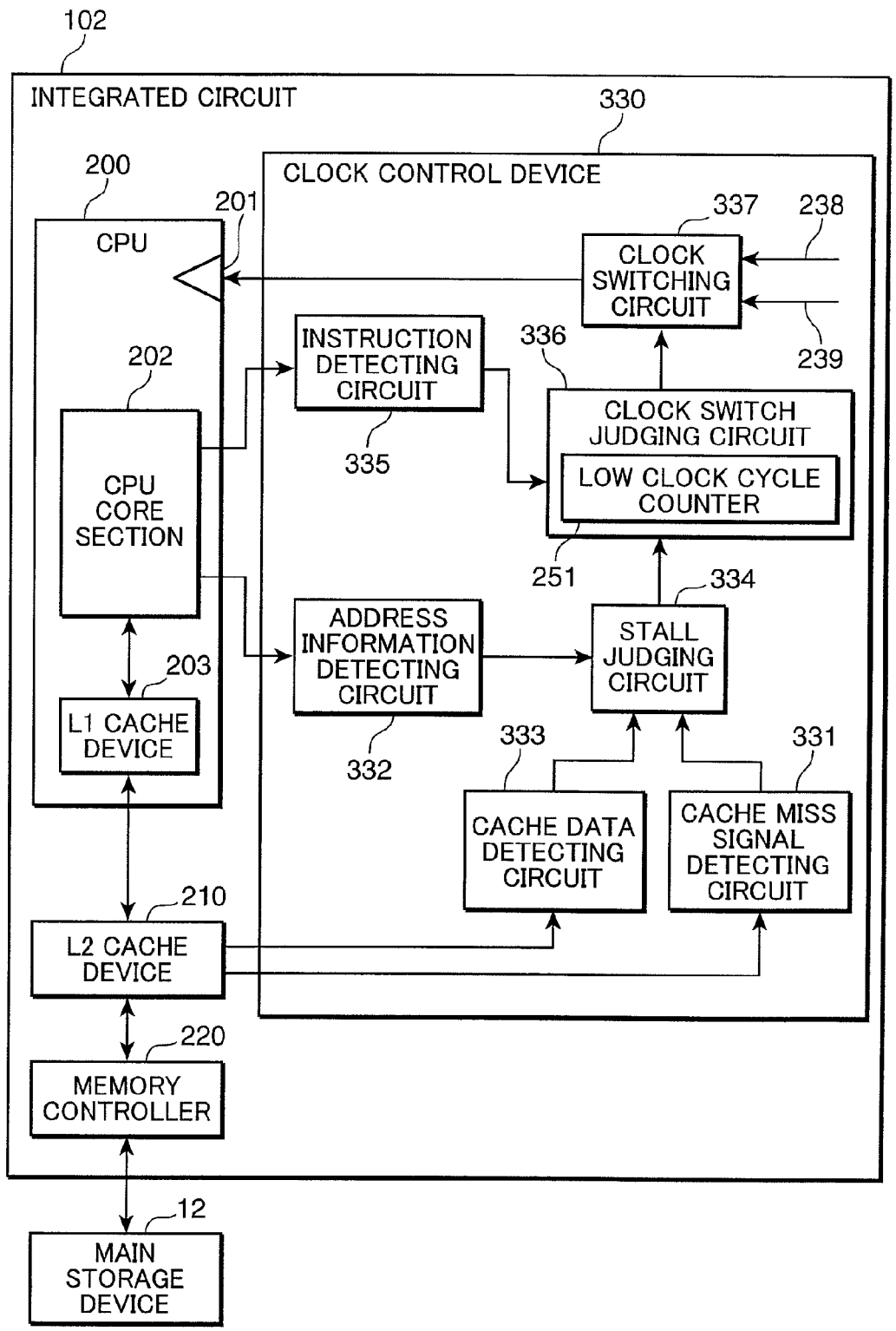
FIG. 9 is a block diagram showing the construction of an integrated circuit according to a third embodiment.

FIG. 9 is a block diagram showing the construction of an integrated circuit 102 according to a third embodiment of the present invention. The integrated circuit 102 shown in FIG. 9 is provided with a CPU 200, an L2 cache device 210, a memory controller 220 and a clock control device 330. In the integrated circuit 102 of the third embodiment shown in FIG. 9, the same construction as in the first embodiment is identified by the same reference numerals and not described.

The clock control device 330 includes a cache miss signal detecting circuit 331, an address information detecting circuit 332, a cache data detecting circuit 333, a stall judging circuit 334, an instruction detecting circuit 335, a clock switch judging circuit 336 and a clock switching circuit 337.

The cache miss signal detecting circuit 331, the address information detecting circuit 332, the cache data detecting circuit 333, the stall judging circuit 334, the instruction detecting circuit 335, the clock switch judging circuit 336 and the clock switching circuit 337 in the third embodiment respectively have the same functions as the cache miss signal detecting section 231, the address information detecting section 232, the cache data detecting section 233, the stall judging section 234, the instruction detecting section 235, the clock switch judging section 236 and the clock switching section 237 in the first embodiment.

In this way, the CPU 200, the L2 cache device 210, the memory controller 220 and the clock control device 330 can be mounted on one integrated circuit.

The above specific embodiments mainly embrace inventions having the following constructions.

A clock control device according to one aspect of the present invention comprises an address information detecting section for detecting access to a main storage device from a central processing unit and detecting address information indicating an accessing address in the main storage device; a cache miss detecting section for detecting the occurrence of a cache miss in a cache device arranged between the central processing unit and the main storage device; a cache data detecting section for detecting the storage of data in the cache device; a stall notifying section for notifying the start and end of a memory stall indicating access to the main storage device based on the address information detected by the address information detecting section, a detection result in the cache miss detecting section and a detection result in the cache data detecting section; an instruction detecting section for detecting whether or not there is any succeeding instruction executable regardless of an order based on a data dependency relationship between a presently executed instruction and a succeeding instruction following the presently executed instruction; a clock switch judging section for receiving the notification of the start and end of the memory stall from the stall notifying section, determining whether or not a memory stall is occurring and judging whether to switch a clock signal to be supplied to the central processing unit to a low clock signal or to stop the clock signal based on a detection result of the instruction detecting section if it is determined that the memory stall is occurring; and a clock switching section for switching the clock signal based on judgment by the clock switch judging section.

A clock control method according to another aspect of the present invention comprises an address information detecting step of detecting access to a main storage device from a central processing unit and detecting address information indicating an accessing address in the main storage device; a cache miss detecting step of detecting the occurrence of a cache miss in a cache device arranged between the central processing unit and the main storage device; a cache data detecting step of detecting the storage of data in the cache device; a stall notifying step of notifying the start and end of a memory stall indicating access to the main storage device based on the address information detected in the address information detecting step, a detection result in the cache miss detecting step and a detection result in the cache data detecting step; an instruction detecting step of detecting whether or not there is any succeeding instruction executable regardless of an order based on a data dependency relationship between a presently executed instruction and a succeeding instruction following the presently executed instruction; a clock switch judging step of receiving the notification of the start and end of the memory stall notified in the stall notifying step, determining whether or not a memory stall is occurring and judging whether to switch a clock signal to be supplied to the central processing unit to a low clock signal or to stop the clock signal based on a detection result in the instruction detecting step if it is determined that the memory stall is occurring; and a clock switching step of switching the clock signal based on judgment in the clock switch judging step.

A clock control program according to still another aspect of the present invention causes a computer to function as an address information detecting section for detecting access to a main storage device from a central processing unit and detecting address information indicating an accessing address in the main storage device; a cache miss detecting section for detecting the occurrence of a cache miss in a cache device arranged between the central processing unit and the main storage device; a cache data detecting section for detecting the storage of data in the cache device; a stall notifying section for notifying the start and end of a memory stall indicating access to the main storage device based on the address information detected by the address information detecting section, a detection result in the cache miss detecting section and a detection result in the cache data detecting section; an instruction detecting section for detecting whether or not there is any succeeding instruction executable regardless of an order based on a data dependency relationship between a presently executed instruction and a succeeding instruction following the presently executed instruction; a clock switch judging section for receiving the notification of the start and end of the memory stall from the stall notifying section, determining whether or not a memory stall is occurring and judging whether to switch a clock signal to be supplied to the central processing unit to a low clock signal or to stop the clock signal based on a detection result of the instruction detecting section if it is determined that the memory stall is occurring; and a clock switching section for switching the clock signal based on judgment by the clock switch judging section.

An integrated circuit according to further another aspect of the present invention comprises a central processing unit; a cache device arranged between the central processing unit and a main storage device; an address information detecting circuit for detecting access to the main storage device from the central processing unit and detecting address information indicating an accessing address in the main storage device; a cache miss detecting circuit for detecting the occurrence of a cache miss in the cache device; a cache data detecting circuit for detecting the storage of data in the cache device; a stall notifying circuit for notifying the start and end of a memory stall indicating access to the main storage device based on the address information detected by the address information detecting circuit, a detection result in the cache miss detecting circuit and a detection result in the cache data detecting circuit; an instruction detecting circuit for detecting whether or not there is any succeeding instruction executable regardless of an order based on a data dependency relationship between a presently executed instruction and a succeeding instruction following the presently executed instruction; a clock switch judging circuit for receiving the notification of the start and end of the memory stall from the stall notifying circuit, determining whether or not a memory stall is occurring and judging whether to switch a clock signal to be supplied to the central processing unit to a low clock signal or to stop the clock signal based on a detection result of the instruction detecting circuit if it is determined that the memory stall is occurring; and a clock switching circuit for switching the clock signal based on judgment by the clock switch judging circuit.

According to these constructions, the address information detecting section detects the access to the main storage device from the central processing unit and the address information indicating the accessing address in the main storage device. The cache miss detecting section detects the occurrence of the cache miss in the cache device arranged between the central processing unit and the main storage device and the cache data detecting section detects the storage of the data in the cache device. The stall notifying section notifies the start and end of the memory stall indicating the access to the main storage device based on the address information detected by the address information detecting section, the detection result in the cache miss detecting section and the detection result in the cache data detecting section. The instruction detecting section detects whether or not there is any succeeding instruction executable regardless of the order based on the data dependency relationship between the presently executed instruction and the succeeding instruction following the presently executed instruction. The clock switch judging section receives the notification of the start and end of the memory stall from the stall notifying section and determines whether or not the memory stall is occurring. Here, if the present occurrence of the memory stall is determined, whether to switch the clock signal to be supplied to the central processing unit to the low clock signal or to stop the clock signal is judged based on the detection result of the instruction detecting section. Then, the clock switching section switches the clock signal based on the judgment by the clock switch judging section.

Thus, the clock frequency of the clock signal to be supplied to the central processing unit is reduced if the succeeding instruction following the presently executed instruction is executable regardless of the order and the clock signal to be supplied to the central processing unit is stopped if the succeeding instruction cannot be executed regardless of the order. Therefore, power consumption can be reduced without reducing performance.

In the above clock control device, the clock switch judging section preferably judges to switch the clock signal to be supplied to the central processing unit to the low clock signal if the presence of any succeeding instruction executable regardless of the order is detected by the instruction detecting section while judging to stop the clock signal to be supplied to the central processing unit if the absence of the succeeding instruction executable regardless of the order is detected by the instruction detecting section.

According to this construction, since the clock signal to be supplied to the central processing unit is switched to the low clock signal if the succeeding instruction executable regardless of the order is present, the succeeding instruction executable regardless of the order is carried out by the low clock signal even during the occurrence of the memory stall. If the succeeding instruction executable regardless of the order is absent, the clock signal to be supplied to the central processing unit is stopped. Thus, power consumption can be reduced without reducing performance.

In the above clock control device, it is preferable that the cache miss detecting section notifies the address information indicating the address of data having experienced the cache miss in the main storage device to the stall notifying section upon detecting the occurrence of a cache miss; the cache data detecting section notifies the address information indicating the address of the stored data in the main storage device to the stall notifying section upon detecting the storage of data in the cache device; and the stall notifying section judges the start of the memory stall based on the address information notified by the address information detecting section and that notified by the cache miss detecting section and judges the end of the memory stall based on the address information notified by the address information detecting section and that notified by the cache data detecting section.

According to this construction, if the occurrence of a cache miss is detected by the cache miss detecting section, the address information indicating the address of the data having experienced the cache miss in the main storage device is notified to the stall notifying section. Further, if the storage of data in the cache device is detected by the cache data detecting section, the address information indicating the address of the stored data in the main storage device is notified to the stall notifying section. The stall notifying section judges the start of the memory stall based on the address information notified by the address information detecting section and that notified by the cache miss detecting section and judges the end of the memory stall based on the address information notified by the address information detecting section and that notified by the cache data detecting section.

Thus, the start of the memory stall can be judged by collating the address information indicating the accessing address in the main storage device and the address information indicating the address of the data having experienced the cache miss in the main storage device. Further, the end of the memory stall can be judged by collating the address information indicating the accessing address in the main storage device and the address information indicating the address of the data stored in the cache device in the main storage device.

In the above clock control device, it is preferable that the stall notifying section notifies a stall start signal indicating the start of the memory stall to the clock switch judging section if the address information notified by the address information detecting section and that notified by the cache miss detecting section coincide and notifies a stall end signal indicating the end of the memory stall to the clock switch judging section if the address information notified by the address information detecting section and that notified by the cache data detecting section coincide; and that the clock switch judging section judges the present occurrence of the memory stall for a period from the notification of the stall start signal to that of the stall end signal by the stall notifying section.

According to this construction, the stall notifying section notifies the stall start signal indicating the start of the memory stall to the clock switch judging section if the address information notified by the address information detecting section and that notified by the cache miss detecting section coincide. Further, the stall notifying section notifies the stall end signal indicating the end of the memory stall to the clock switch judging section if the address information notified by the address information detecting section and that notified by the cache data detecting section coincide. The clock switch judging section judges the present occurrence of the memory stall for the period from the notification of the stall start signal to that of the stall end signal from the stall notifying section.

Thus, the occurrence of the memory stall can be easily judged by receiving the stall start signal and the stall end signal.

In the above clock control device, it is preferable that the instruction detecting section notifies an out-of-order instruction number indicating the number of the succeeding instruction(s) executable regardless of the order to the clock switch judging section if the succeeding instruction executable regardless of the order is present; and that the clock switch judging section determines a cycle of switching the clock signal to be supplied to the central processing unit to the low clock signal in accordance with the out-of-order instruction number notified by the instruction detecting section.

According to this construction, the instruction detecting section notifies the out-of-order instruction number indicating the number of the succeeding instruction(s) executable regardless of the order to the clock switch judging section if the succeeding instruction executable regardless of the order is present. The clock switch judging section determines the cycle of switching the clock signal to be supplied to the central processing unit to the low clock signal in accordance with the out-of-order instruction number notified by the instruction detecting section.

Thus, the cycle of switching the clock signal to be supplied to the central processing unit to the low clock signal is determined in accordance with the out-of-order instruction number indicating the number of the succeeding instruction(s) executable regardless of the order, wherefore the cycle of switching to the low clock signal can be properly controlled.

In the above clock control device, the clock switch judging section preferably includes a counter, sets the out-of-order instruction number as the value of the counter if the out-of-order instruction number is notified by the instruction detecting section, judges whether or not the value of the counter is 0 if the present occurrence of the memory stall is determined, sends a clock stop signal indicating the stop of the clock signal to be supplied to the central processing unit to the clock switching section if the value of the counter is judged to be 0, decrements the value of the counter after sending a low clock switch signal indicating the switch of the clock signal to be supplied to the central processing unit to the low clock signal to the clock switching section if the value of the counter is judged not to be 0, and stops the clock stop signal or the low clock switch signal being sent after the value of the counter is reset if the absence of the memory stall is determined.

According to this construction, the clock switch judging section sets the out-of-order instruction number as the value of the counter if the out-of-order instruction number is notified by the instruction detecting section, and judges whether or not the value of the counter is 0 if the present occurrence of the memory stall is determined. If the value of the counter is judged to be 0, the clock stop signal indicating the stop of the clock signal to be supplied to the central processing unit is sent to the clock switching section. On the other hand, if the value of the counter is judged not to be 0, the value of the counter is decremented after the low clock switch signal indicating the switch of the clock signal to be supplied to the central processing unit to the low clock signal is sent to the clock switching section. If the absence of the memory stall is determined, the clock stop signal or the low clock switch signal being sent is stopped after the value of the counter is reset.

Since the out-of-order instruction number is set as the value of the counter, the cycle of sending the low clock sending signal can be easily determined based on the value of the counter.

In the above clock control device, it is preferable that a prefetch buffer for storing an instruction fetched from the main storage device by the central processing unit and a prefetch buffer detecting section for detecting that the prefetch buffer is empty are further provided; and that the clock switch judging section judges to switch the clock signal to be supplied to the central processing unit to the low clock signal if the prefetch buffer is detected to be empty by the prefetch buffer detecting section and determines whether or not a memory stall is occurring if the prefetch buffer is detected not be to empty by the prefetch buffer detecting section.

According to this construction, the instruction fetched from the main storage device by the central processing unit is stored in the prefetch buffer. Further, the prefetch buffer detecting section detects that the prefetch buffer is empty. The clock switch judging section judges to switch the clock signal to be supplied to the central processing unit to the low clock signal if the prefetch buffer is detected to be empty while determining whether or not the memory stall is occurring if the prefetch buffer is detected not to be empty.

Thus, the low clock signal is supplied to the central processing unit if the prefetch buffer is empty, wherefore power consumption can be reduced while the central processing unit is not executing any instruction.

The specific embodiments or examples described in the detailed description of the invention are absolutely for elucidating the technical contents of the present invention and the present invention should not be narrowly interpreted by being limited only to such specific examples. Various changes can be made within the spirit of the present invention and the scope as claimed.

INDUSTRIAL APPLICABILITY

A clock control device, a clock control method, a clock control program and an integrated circuit according to the present invention have a function of controlling the switching of a clock signal during a memory stall and are useful for portable electronic devices such as PDAs, mobile communication terminals, digital cameras and portable audio devices. The clock control device, clock control method, clock control program and integrated circuit can also be applied to battery-driven electronic devices.

What is claimed is:

1. A clock control device, comprising:
   an address information detecting section for detecting access to a main storage device from a central processing unit and detecting address information indicating an accessing address in the main storage device;
   a cache miss detecting section for detecting the occurrence of a cache miss in a cache device arranged between the central processing unit and the main storage device;
   a cache data detecting section for detecting the storage of data in the cache device;
   a stall notifying section for notifying the start and end of a memory stall indicating access to the main storage device based on the address information detected by the address information detecting section, a detection result in the cache miss detecting section and a detection result in the cache data detecting section;
   an instruction detecting section for detecting whether or not there is any succeeding instruction executable regardless of an order based on a data dependency relationship between a presently executed instruction and a succeeding instruction following the presently executed instruction;
   a clock switch judging section for receiving the notification of the start and end of the memory stall from the stall notifying section, determining whether or not a memory stall is occurring and judging whether to switch a clock signal to be supplied to the central processing unit to a low clock signal or to stop the clock signal based on a detection result of the instruction detecting section if it is determined that the memory stall is occurring; and
   a clock switching section for switching the clock signal based on judgment by the clock switch judging section.

2. A clock control device according to claim 1, wherein the clock switch judging section:
   judges to switch the clock signal to be supplied to the central processing unit to the low clock signal if the presence of any succeeding instruction executable regardless of the order is detected by the instruction detecting section; and
   judges to stop the clock signal to be supplied to the central processing unit if the absence of the succeeding instruction executable regardless of the order is detected by the instruction detecting section.

3. A clock control device according to claim 2, wherein:
   the cache miss detecting section notifies the address information indicating the address of data having experienced the cache miss in the main storage device to the stall notifying section upon detecting the occurrence of a cache miss;
   the cache data detecting section notifies the address information indicating the address of the stored data in the main storage device to the stall notifying section upon detecting the storage of data in the cache device; and
   the stall notifying section judges the start of the memory stall based on the address information notified by the address information detecting section and that notified by the cache miss detecting section and judges the end of the memory stall based on the address information notified by the address information detecting section and that notified by the cache data detecting section.

4. A clock control device according to claim 3, wherein:
   the stall notifying section notifies a stall start signal indicating the start of the memory stall to the clock switch judging section if the address information notified by the address information detecting section and that notified by the cache miss detecting section coincide and notifies a stall end signal indicating the end of the memory stall to the clock switch judging section if the address information notified by the address information detecting section and that notified by the cache data detecting section coincide; and
   the clock switch judging section judges the present occurrence of the memory stall for a period from the notification of the stall start signal to that of the stall end signal by the stall notifying section.

5. A clock control device according to claim 2, wherein:
   the instruction detecting section notifies an out-of-order instruction number indicating the number of the succeeding instruction(s) executable regardless of the order to the clock switch judging section if the succeeding instruction executable regardless of the order is present; and
   the clock switch judging section determines a cycle of switching the clock signal to be supplied to the central processing unit to the low clock signal in accordance with the out-of-order instruction number notified by the instruction detecting section.

6. A clock control device according to claim 5, wherein the clock switch judging section:
includes a counter,
sets the out-of-order instruction number as the value of the counter if the out-of-order instruction number is notified by the instruction detecting section,
judges whether or not the value of the counter is 0 if the present occurrence of the memory stall is determined,
sends a clock stop signal indicating the stop of the clock signal to be supplied to the central processing unit to the clock switching section if the value of the counter is judged to be 0,
decrements the value of the counter after sending a low clock switch signal indicating the switch of the clock signal to be supplied to the central processing unit to the low clock signal to the clock switching section if the value of the counter is judged not to be 0, and
stops the clock stop signal or the low clock switch signal being sent after the value of the counter is reset if the absence of the memory stall is determined.

7. A clock control device according to claim 1, further comprising:
a prefetch buffer for storing an instruction fetched from the main storage device by the central processing unit; and
a prefetch buffer detecting section for detecting that the prefetch buffer is empty are further provided,
wherein the clock switch judging section judges to switch the clock signal to be supplied to the central processing unit to the low clock signal if the prefetch buffer is detected to be empty by the prefetch buffer detecting section and determines whether or not a memory stall is occurring if the prefetch buffer is detected not be to empty by the prefetch buffer detecting section.

8. A clock control method, comprising:
an address information detecting step of detecting access to a main storage device from a central processing unit and detecting address information indicating an accessing address in the main storage device;
a cache miss detecting step of detecting the occurrence of a cache miss in a cache device arranged between the central processing unit and the main storage device;
a cache data detecting step of detecting the storage of data in the cache device;
a stall notifying step of notifying the start and end of a memory stall indicating access to the main storage device based on the address information detected in the address information detecting step, a detection result in the cache miss detecting step and a detection result in the cache data detecting step;
an instruction detecting step of detecting whether or not there is any succeeding instruction executable regardless of an order based on a data dependency relationship between a presently executed instruction and a succeeding instruction following the presently executed instruction;
a clock switch judging step of receiving the notification of the start and end of the memory stall notified in the stall notifying step, determining whether or not a memory stall is occurring and judging whether to switch a clock signal to be supplied to the central processing unit to a low clock signal or to stop the clock signal based on a detection result in the instruction detecting step if it is determined that the memory stall is occurring; and
a clock switching step of switching the clock signal based on judgment in the clock switch judging step.

9. A computer readable recording medium storing a clock control program for causing a computer to function as at least:
an address information detecting section for detecting access to a main storage device from a central processing unit and detecting address information indicating an accessing address in the main storage device;
a cache miss detecting section for detecting the occurrence of a cache miss in a cache device arranged between the central processing unit and the main storage device;
a cache data detecting section for detecting the storage of data in the cache device;
a stall notifying section for notifying the start and end of a memory stall indicating access to the main storage device based on the address information detected by the address information detecting section, a detection result in the cache miss detecting section and a detection result in the cache data detecting section;
an instruction detecting section for detecting whether or not there is any succeeding instruction executable regardless of an order based on a data dependency relationship between a presently executed instruction and a succeeding instruction following the presently executed instruction;
a clock switch judging section for receiving the notification of the start and end of the memory stall from the stall notifying section, determining whether or not a memory stall is occurring and judging whether to switch a clock signal to be supplied to the central processing unit to a low clock signal or to stop the clock signal based on a detection result of the instruction detecting section if it is determined that the memory stall is occurring; and
a clock switching section for switching the clock signal based on judgment by the clock switch judging section.

10. An integrated circuit, comprising:
a central processing unit;
a cache device arranged between the central processing unit and a main storage device;
an address information detecting circuit for detecting access to the main storage device from the central processing unit and detecting address information indicating an accessing address in the main storage device;
a cache miss detecting circuit for detecting the occurrence of a cache miss in the cache device;
a cache data detecting circuit for detecting the storage of data in the cache device;
a stall notifying circuit for notifying the start and end of a memory stall indicating access to the main storage device based on the address information detected by the address information detecting circuit, a detection result in the cache miss detecting circuit and a detection result in the cache data detecting circuit;
an instruction detecting circuit for detecting whether or not there is any succeeding instruction executable regardless of an order based on a data dependency relationship between a presently executed instruction and a succeeding instruction following the presently executed instruction;
a clock switch judging circuit for receiving the notification of the start and end of the memory stall from the stall notifying circuit, determining whether or not a memory stall is occurring and judging whether to switch a clock signal to be supplied to the central processing unit to a low clock signal or to stop the clock signal based on a detection result of the instruction detecting circuit if it is determined that the memory stall is occurring; and
a clock switching circuit for switching the clock signal based on judgment by the clock switch judging circuit.

* * * * *